C. A. SIECKE.

Cigar-Box.

No. 6,458.

Reissued May 25, 1875.

WITNESSES.

C. W. Lemon

J. Wm. Lamers

INVENTOR.

C. A. Siecke pr F. A. Lehmann

Atty.

THE GRAPHIC CO. PHOTO-LITH. 39 & 41 PARK PLACE, N.Y.

UNITED STATES PATENT OFFICE.

CHARLES A. SIECKE, OF NEW YORK, N. Y., ASSIGNOR TO HIMSELF AND AUGUSTUS WANNACK, OF SAME PLACE.

IMPROVEMENT IN CIGAR-BOXES.

Specification forming part of Letters Patent No. 158,137, dated December 22, 1874; reissue No. 6,458, dated May 25, 1875; application filed April 24, 1875.

*To all whom it may concern:*

Be it known that I, CHAS. A. SIECKE, of New York city, in the county of New York and State of New York, have invented certain new and useful Improvements in Cigar-Boxes; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention relates to an improved air-tight cigar-box; and it consists in making the box of metal, and providing it with a branding-surface, of wood, pasteboard, or other suitable substance, upon which the manufacturer's stamp may be branded, as will be more fully described hereafter.

Figure 1:
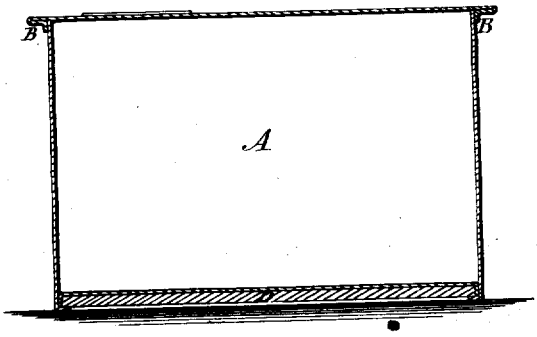
Figure 2:
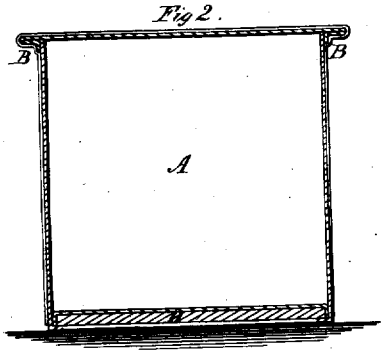

Figs. 1 and 2 represent vertical longitudinal and cross-sections of my invention.

A represents an ordinary cigar-box, made of metal, so as to be perfectly air-tight. The cover is provided with a wide projecting flange, B, around its edges, so that the box may be readily opened by cutting away this flange with a pair of shears. This box is provided with a branding-surface, of wood, pasteboard, or other suitable material, upon which the manufacturer's stamp is branded, which branding-surface is placed within the sides of the box, and held in position by turning over the edges. Though here shown as placed inside of the bottom of the box, it is evident that this surface may be affixed in or to the box in any desired manner or position, as the whole object of my invention is to use a metal or air-tight box, and provide it with a branding-surface.

The revenue laws require that all cigar-boxes shall be branded with the manufacturer's stamp, so that were this branding surface not provided metal boxes could not be used.

The great trouble with the ordinary wooden boxes is that they are so porous that not only do they allow all the moisture in the cigars to escape, but they allow the tobacco-worm to live and multiply in the cigars to such an extent as to entirely destroy them.

In those high districts where the air is very thin and dry, cigars packed in the ordinary wooden boxes soon become so dry and brittle as to crumble under the touch.

In order to retain the moisture in the cigars, I make my boxes air-tight, and thus both keep the cigars indefinitely as fresh and green as when first packed, but also prevent the ravages of the tobacco-worm, which cannot live and reproduce in an air-tight box.

When tobacco is in a moist condition, and packed as cigars in these air-tight packages, the chemical elements of it undergo a process of oxidation, which improves the nicotiacine flavor, takes away the rank taste, and destroys, or rather oxidizes, the nicotine, which is a poisonous alkaloid substance, materially differing from the nicotiacine, which it is desirable to preserve.

The importance of this method of packing cigars will be appreciated by all smokers and dealers who know the benefit of preserving the original moisture and flavor.

Having thus described my invention, I claim—

A metal cigar-box that is provided with a supplemental branding surface of wood, pasteboard, or other suitable material, to receive the manufacturer's brand, substantially as specified.

In testimony that I claim the foregoing, I have hereunto set my hand this 23d day of April, 1875.

CHARLES ALBERT SIECKE.

Witnesses:
T. J. MCKEE,
M. V. B. GALLAUDET.